Nov. 28, 1939. W. HAUPT 2,181,550
RIVETED JOINT
Filed Nov. 21, 1936
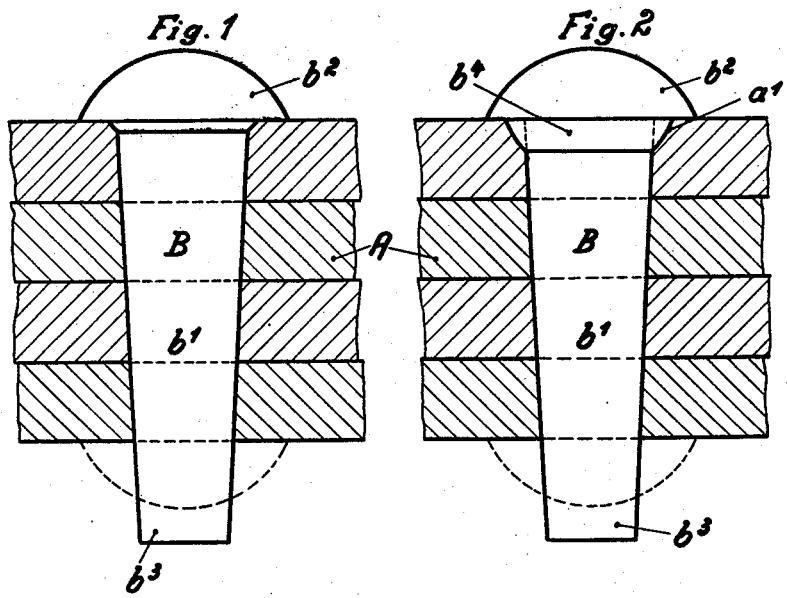
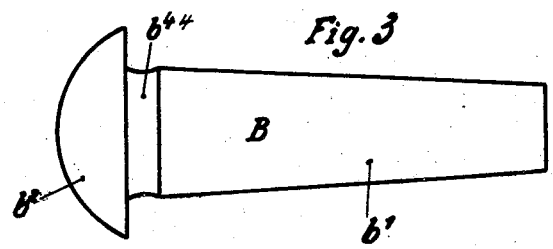
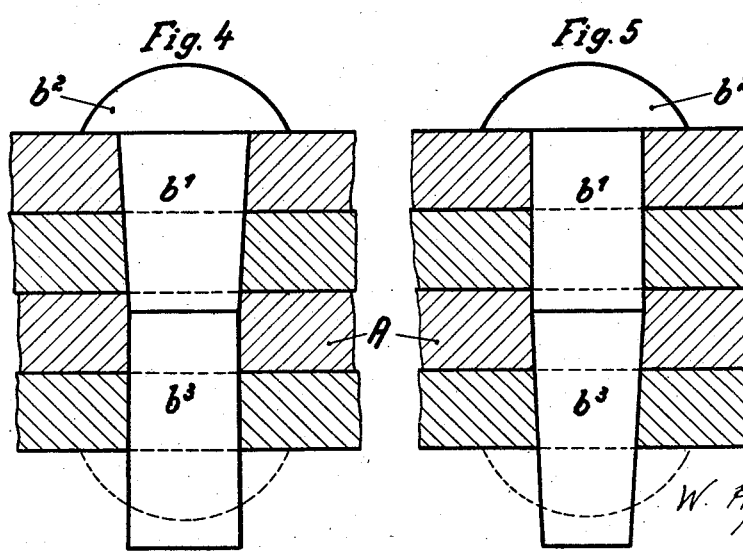
W. Haupt
Inventor
By Glascock Downing & Seebold
Attys.

Patented Nov. 28, 1939

2,181,550

UNITED STATES PATENT OFFICE 2,181,550

RIVETED JOINT

Wilhelm Haupt, Dortmund-Hoerde, Germany

Application November 21, 1936, Serial No. 112,164
In Germany December 7, 1935

2 Claims. (Cl. 78—54)

The rivets hitherto generally used have a cylindrical shank with a finished head (the so-called set head) at one end and a head to be formed when riveting (the so-called rivet tail) at the other end. Before the rivet tail is shaped the rivet is called the "crude rivet" and after the shaping of the rivet tail the "clinched" or "finished rivet". The cylindrical shank of the crude rivet in red hot condition was hitherto inserted without force into cylindrically bored holes right up to the set head. The set head is then pressed tightly with a dolly against the article to be riveted and the free end tail formed by striking with a so-called riveting hammer. To enable the hot crude rivet to be inserted without difficulty into the rivet hole, the diameter of the shank of the cold rivet is made about 1 millimeter smaller than the diameter of the rivet hole. By striking with the riveting hammer the rivet shank (provided the rivet is not too long) will in the ordinary way be upset (that is reduced in length and increased in thickness) so that the cooled finished rivet completely fills the hole (that is the surface of the shank bears at all points against the wall of the hole).

However, in the case of very long rivets the rivet shank is not sufficiently upset along its entire length to bear everywhere snugly against the wall of the hole. Mostly the upsetting only takes place near the tail whereas an undesirable clearance remains between the shank and hole wall near the set head. Consequently most instructions for riveted structures prescribe that the rivets must be employed only up to a certain clamping length (that is the distance between the inner edges of the set head and of the shaped tail), and that in the case of longer clamping lengths conical bolts, that is conically turned screw bolts, which are driven in cold state into correspondingly conically reamed holes must be used. These conical bolts are undoubtedly good in so far as, provided they are worked sufficiently accurately, they fill the holes well and bear tightly against the hot wall. However they are open to the objection that, on the one hand, they are very expensive and, on the other hand, they do not press together as well as a rivet the constructional parts to be joined. The hot clinched rivet contracts in longitudinal direction while cooling and thus exerts a strong pressure, the so-called clamping pressure, on the construction clamped between the set head and the clinched tail.

According to the invention the objections of the known riveted joints even in the case of long rivet shanks, are overcome by a rivet joint in which rivets with at least partly conical shank are employed and pressed into a correspondingly tapered rivet hole. When employing headed rivets the rivet shank tapers towards the free end or tail. In these riveted joints the diameter of the crude rivet as compared with the diameter of the corresponding rivet hole is so dimensioned, that the heated rivet is not inserted as heretofore loosely in the rivet hole but can only be inserted by force until the set head bears. After the rivet has been pressed into the rivet hole the tail is formed in the same manner as in the case of rivets or riveted connection hitherto used.

The result of forcing home the heated tapered rivet into the conical rivet hole is that the surface of the rivet shank is strongly pressed against the wall of the hole before the tail is formed. Consequently the upsetting effect occurring during the shaping of the rivet tail is no longer necessary for filling the rivet hole well, provided the rivet shank is tapered along its entire length. As, therefore the filling of the hole is according to the invention accomplished already by the conical shape of the rivet shank, it is no longer dependent upon the length of the rivet but can be attained in a reliable manner also with long rivets. As compared with the usual joints, for which driven in conically turned bolts are used, the riveted connection according to the invention possesses chiefly the advantage that it is much cheaper. Whereas the conical bolts which are driven in cold, must be accurately and cleanly machined, the tapered rivet employed according to the invention can be less accurately turned or even only pressed, as it is driven in in red hot condition, all unevennesses of the surface being easily smoothed owing to the plastic state of the glowing material of the rivet.

The riveted joint according to the invention can be produced by employing headed rivets or headless rivets. In order to avoid considerable upsetting on the rivet shank near the end of the rivet or below the set head during the forcible driving in of the rivet, the rivet can be heated at this portion to a lower temperature than is customary for riveting, so that the material of the rivet is here less plastic. The conical rivet hole on the side intended to accommodate the thickest portion of the rivet from which the driving in of the rivet is effected that is the side of the set head can be widened, this widening taking up any material displaced by upsetting during the driving in of the rivet.

Excessive upsetting of the driven rivet end can likewise be avoided by narrowing the rivet shank near the driven rivet end or under the set head, this narrowing being neutralized by the upsetting occurring during the driving in of the rivet.

It has often been found advantageous to taper only a portion of the shank, for example half the shaft length, making the remainder of the shaft cylindrical. The rivet hole must then be correspondingly shaped. In this form of construction of the inventive idea the good filling of the hole is obtained on the one side by the conical shape of the shank and on the other side by the upsetting to which the cylindrical portion is subjected during the driving in of the rivet or during the shaping of the rivet tail. These forms of construction possess the advantage that for obtaining a predetermined minimum rivet diameter which must be present for reasons of strength and which is laid down by the instructions for the calculation, a smaller quantity of rivet material is necessary owing to the short length of the conical portion of the shank and that less work is required for conically reaming the holes. By dividing the shank into a conical and a cylindrical part also the cylindrical portion of the hole is well filled, as the upsetting pressure produced during the clinching of the rivet is sufficient to fill with the material of the rivet the relatively short cylindrical portion of the rivet hole.

The conicity of the tapered shank is not confined to a certain measurement. It can for example, be 1:100 or 1:200.

Several embodiments of the invention are illustrated by way of example in the accompanying drawing, in which:

Fig. 1 shows a riveted joint in which a rivet B with shank $b^1$ tapered along its entire length and having a set head $b^2$ is pressed into the parts A to be joined. The tail which is not yet clinched is formed from the shank end $b^3$.

The riveted joint according to Fig. 2 differs from that shown in Fig. 1 in that the opening of the rivet hole in the part A to be riveted is widened or has a recess $a^1$ on the side adjacent the set head, this recess taking up the material $b^4$ of the shank $b^1$ upset under the set head during the driving in of the rivet.

Fig. 3 shows a rivet B with tapered shank $b^1$ having a narrowing in the shank part $b^{44}$ below the set head $b^2$, this narrowing being equalized by upsetting during the driving in of the rivet.

Fig. 4 shows a riveted joint in which the shaft portion $b^1$ extending from the set head $b^2$ is conical whereas the remaining portion $b^3$ of the shaft is cylindrical.

Contrary to Fig. 4, Fig. 5 shows a riveted joint in which a cylindrical portion $b^1$ extends from the set head $b^2$ and a tapered portion $b^3$ extends from the cylindrical portion.

The shape of the set head and rivet tail shown in the drawing is only given by way of example. The set head and rivet tail may evidently also be of some other shape for example a countersunk set head and rivet tail may be employed instead of the ellipsoidal shape shown. The set head may likewise be omitted entirely, and a headless rivet pin which is tapered at least upon part of its length employed, the heads being then formed on both ends, during the driving in or clinching of the rivet.

The invention relates to the riveted joints illustrated and described and to the rivets employed for their production.

I claim:

1. In a riveted joint employing rivets with relatively long shanks, a plurality of lapped plate members having a tapered aperture extending through at least a part of said members, a bell mouth recess extending into one of said outer members, and a rivet having a tapered shank seated in said aperture, said bell mouth recess receiving the material of the rivet shank after it has been upset and expanded by the riveting operation.

2. A riveted joint preferably employing a heated rivet with a relatively long shank, comprising a rivet having a shank tapered towards its tail on at least a portion of its length, and constructional members having a rivet hole tapered corresponding to the rivet shank, said shank extending through said hole, the opening of the tapered hole in the member in the side designed to receive the thicker end of the rivet shank having a widened portion adapted to receive the material of the rivet shank upset during the driving in and clinching of the rivet.

WILHELM HAUPT.